UNITED STATES PATENT OFFICE 2,396,938

METHOD OF TREATING BOILERS

Frederick C. Bersworth, Verona, N. J., assignor to The Martin Dennis Company, Newark, N. J., a corporation of New Jersey No Drawing. Application January 22, 1944, Serial No. 519,408

11 Claims. (Cl. 134—2)

This invention relates to procedure for removing scale from boilers and preventing scale formation in boilers.

In accordance with this invention it is possible to treat boilers with a composition which is not injurious to the boiler tubes or other parts and which is capable of removing even hard, thick coatings of scale and of preventing further scale formation.

The treating composition of this invention is an aqueous solution of two principal constituents. One of these is an alkali metal salt of an alkylene polyamine tetra (or higher) acetic acid having the general formula:

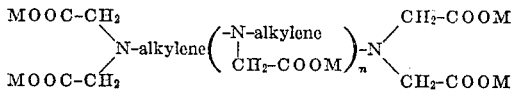

in which M is an alkali metal and $n$ is zero or a positive integer and in which none of the alkylene groups contains more than four carbon atoms. The other of these constituents is an alkali metal hydroxide, or a salt thereof with a water soluble, weak acid, and has a pH of at least about 8.5.

The first of these constituents, when $n=$zero, may be the tetra sodium (or potassium or other alkali metal salt) of ethylene diamine tetraacetic acid, or of propylene 1,2-diamine tetraacetic acid, or of propylene 1,3-diamine tetraacetic acid, or of one of the various butylene diamine tetraacetic acids. When $n=1$ this constituent may be the penta-alkali metal salt of diethylene triamine pentaacetic acid, or of the dipropylene triamine pentaacetic acids, etc.

The second constituent must be soluble in water and not merely colloidally dispersible therein as is ordinary soap for example.

A third constituent which may be included to advantage, although not necessary, is any one or more of the water soluble organic polyhydroxy compounds, for example glucose, sorbitol, the hydrolysis products of corn starch, mannitol, glycerine, diethylene glycol, ethylene glycol, etc. A further example of such a polyhydroxy compound is the sugar-like polymer obtained from formaldehyde in alkaline solution. When the first component is made according to my copending application Serial No. 491,669, filed June 21, 1943, formaldehyde is used in alkaline solution and the resulting sugar-like polymer is therefore always present in the crude reaction product.

The relative proportions in the treating solution of the poly-alkali metal salt of the alkylene polyamine polyacetic acid and the other alkali metal salt or hydroxide referred to above are preferably between 100 to 5 and 100 to 50, each respectively, depending upon the exact nature of each constituent. Best results are usually obtained with proportions between 100 to 10 and 100 to 25, each respectively. The proportions of alkylene polyamine polyacetic acid to the other alkali metal salt or hydroxide refer to preferred additions to neutral or basic solutions. If there is any acid initially present in the water to which the constituents of this invention are added, enough alkali metal salt or hydroxide must be added to bring the system to a pH of about 7, before adding said constituents in the proportions already indicated. The polyhydroxy compounds are preferably present in about an equal molecular quantity with the alkylene polyamine polyacetic acid salt though any amount up to that point appears to be of value.

It is already known, as set forth in Munz patent 2,240,957, that compounds such as the alkali metal salts of:

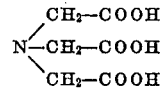

and

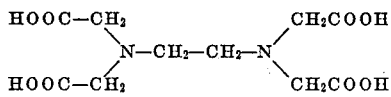

are suitable for treating hard water to prevent the formation of precipitates. I have found, however, that such applicability is no criterion whatever of the applicability of these compounds for treating boilers in the manner herein set forth.

These compounds described by Munz, either alone or with soaps, are entirely unsuited to the latter purpose because it is necessary that an alkali metal salt or an alkali hydroxide as described above be present with the alkylene polyamine polyacetic acid salt to obtain satisfactory results. It has been found that although freshly precipitated calcium salts may be dissolved by the sodium salt of ethylene diamine tetraacetic acid, this latter salt will not dissolve or loosen the hard incrustations of calcium, magnesium, and iron salts found inside boiler tubes when used alone. The addition of a relatively small proportion of alkali metal hydroxide or a water soluble alkali metal salt of a comparatively weak water soluble acid will serve to loosen and/or dissolve such scale formation as may be present. Once the scale has been all, or substantially all, removed the tubes of the boiler may be kept free from scale by adding the herein described composition, but in lesser quantities, to the feed water. Furthermore, any of these polyamine polyacetic acid salts having less than four —CH₂COOM groups are unsuited for the present purpose, even when the alkali metal salt or hydroxide (the second constituent herein referred to) is present.

The theoretical considerations for the requirement that at least four —CH₂—COOM groups be present are not entirely clear. Apparently the solubilizing effect is due in part, at least, to these groups, and fewer than four to a molecule is insufficient to put the difficultly soluble scale into solution or to loosen it.

The treating composition may be the crude reaction product produced in accordance with my copending application Serial No. 491,669, filed June 21, 1943. This may be produced by reacting an alkylene polyamine of the formula:

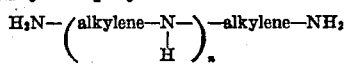

in which $n$ is zero or a positive integer, and in which none of the alkylene groups contains more than four carbon atoms, with an alkali-metal cyanide and formaldehyde with sufficient sodium hydroxide to bring the pH to at least about 9. The reaction is carried out at a temperature of about 60–80° C. under sufficiently reduced pressure to cause the mixture to boil at that temperature. (Constant stirring together with the boiling serves to remove ammonia as fast as it is formed.) It is essential in order to obtain proper yields that the free cyanide present in the reaction mixture at any one time be not more than one-quarter the amount necessary to react completely with the amine, and that the amount of free formaldehyde present in the reaction mixture at any one time be about five per cent less than the sodium cyanide present. When the reaction is substantially completed the temperature may be raised and a slight excess of formaldehyde added to react with any unreacted cyanide.

This crude reaction product ordinarily contains enough excess alkali metal hydroxide as well as polyhydroxy compounds (which are produced as a side reaction by the polymerization of formaldehyde in the presence of an alkali) to be suitable for use without modification in carrying out the procedure of this invention. If insufficient amounts of any constituent are present, the reaction product may be fortified with respect to these constituents until the desired amount of each is present. It is not necessary, however, in carrying out the present invention to employ this crude reaction product or to prepare the alkylene polyamine polyacetic acid salts in accordance with the said copending application.

When treatment of a boiler is contemplated by the method of this invention, several factors must be first ascertained. In regard to the boiler the factors are in particular the severity of the scaling, the type of boiler, the capacity, and the daily consumption of water. In regard to the feed water the degree of hardness and the pH must be determined. Each boiler must be treated individually and any generalizations made must be modified to suit particular requirements. If the boiler may be operated, then the scale may be removed while it is in operation; if the boiler is too badly scaled to be operated the scale may be removed as shown below. The type of construction of the boiler is important as some boilers, e. g. vertical tube boilers, tend to clog easily, and difficulty may be experienced if too much scale is loosened at one time. The capacity and daily consumption of the boiler must be known so that the proper concentration of products may be employed. Where the degree of hardness of the water to which the compounds of this invention are being added is considerable, the amount of the alkali metal salt of an alkylene polyamine polyacetic acid must be increased by that amount necessary to keep the calcium and magnesium salts in that water in solution. (It has been found that one mol of the sodium salt or three-quarters mol of the potassium salt of this alkylene polyamine polyacetic acid compound is sufficient to keep in solution one mol of the calcium or magnesium salts.) If the feed water is acidic, sufficient alkali must be added to neutralize it before the usual amount of alkali is added.

The following procedure is recommended for cleaning boilers which are too badly encrusted with scale to be operated:

The boiler is filled with a solution of approximately 0.1 to 2 per cent by weight of a compound represented by the formula:

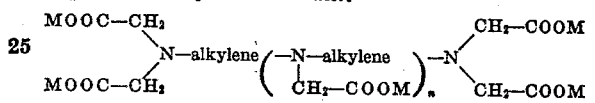

in which M is an alkali metal and $n$ is zero or a positive integer and in which none of the alkylene groups contains more than four carbon atoms. To each 100 parts of this compound is added 5 to 50 parts and preferably 10 to 25 parts of an alkali metal hydroxide or a water soluble alkali metal salt of a water-soluble, weak acid, said hydroxide or salt having a pH greater than 8.5. A number of mols of a polyhydroxy compound may be added up to the number of mols of alkylene polyamine polyacetic acid salt. The solution should be heated to simmering for a suitable length of time, for example about a week for a badly scaled boiler. The fire is kept low enough to prevent burning of deposited sludge, but hot enough to permit some turbulence due to convection. After this period the solution and loose material is dumped and the procedure repeated. (In a very badly scaled boiler it may be necessary to repeat the operation more than twice before the boiler scale has been sufficiently removed to permit safe use of the boiler.)

Among the alkali metal salts of alkylene polyamine tetra (or higher) acetic acids which have been found satisfactory in the foregoing procedure are the sodium and potassium salts of ethylene diamine tetraacetic acid, and the sodium salts of propylene 1,2-diamine tetraacetic acid, propylene 1,3-diamine tetraacetic acid, 1,4-butylene diamine tetraacetic acid, dipropylene 1,2-triamine and 1,3-triamine pentaacetic acid, and diethylene triamine pentaacetic acid. The concentrations of these salts varied between about 0.1 and about 2 per cent, depending upon conditions of operation and of the boiler. Among the polyhydroxy compounds found to be suitable are glucose, sorbitol, glycerin, mannitol, ethylene glycol, diethylene glycol and soluble hydrolysis products of starch. These were added in equimolecular amounts or less. As the alkali metal hydroxide or salt the following are found to be satisfactory: sodium hydroxide, sodium carbonate, sodium phosphate (Na₃PO₄), sodium borate, and potassium oxalate. Mixtures of the foregoing compounds in the proportions already set forth have been found to remove scale effectively from badly scaled boilers. Also found suitable for this purpose is, for example, a slightly less than one per cent solution in water of the crude reaction product made as described above and in my copending application Serial No. 491,669 which, in this case, had approximately the following composition:

| | Per cent |
|---|---|
| Tetra-sodium salt of ethylene diamine tetraacetic acid | 60 |
| Tri-glycine sodium salt | 5 |
| Polymeric materials | 5 |
| Sugar-like products (polyhydroxy compounds) | 20 |
| Unidentified materials (polymerized peptide-like amino acids) | 10 | plus an excess of free NaOH amounting to ¼ to ½ mol per mol of the said tetra sodium salt of ethylene diamine tetraacetic acid.

Further cleaning of scale may be accomplished while the boiler is in operation. The amount of boiler feed water used is first measured, and the degree of hardness of the water as well as the substances causing the hardness is found by analysis. Sufficient of the alkali metal hydroxide or salt is added if the water is acid to bring it to a pH of about 7, and in addition the same materials in the same quantities as outlined above for cleaning a non-operating boiler are added to the feed water. The calculated daily amount to be so added may conveniently be divided into three parts and added three times a day. Care must be taken to blow down the boiler properly at intervals or the sludge which is removed will be collected in restricted areas and cake to a dense solid which is impossible to remove by further treatment.

It is to be further noted that as the pressure, and therefore the temperature, of the boiler is increased, it is preferable to approach the upper limit of the amount of the alkali metal salt or hydroxide specified. Apparently under the extreme conditions existing in a boiler, hydrolysis of the polyamino polyacetic acid salt tends to take place, but repressed by the addition of alkali.

It is evident that for successful employment of this invention care is required on the part of the engineer in charge. By proper application of the principles laid down, boilers with a wide variety of characteristics and with widely different scale compositions may be treated successfully.

I claim:

1. The method for treating a boiler to remove and prevent scale which comprises introducing into the feed-water of the boiler a composition containing as its essential constituents a polyalkali metal salt of an alkylene polyamine polyacetic acid of the general formula

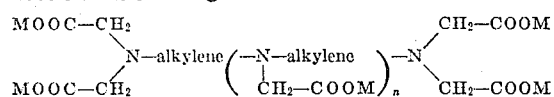

wherein M is an alkali metal, n is zero or a positive integer and the alkylene groups contain not more than four carbon atoms each, and 5 to 50 per cent as much by weight of a water-soluble alkaline-reacting compound having a pH of at least about 8.5 and selected from the group consisting of alkali metal hydroxides and salts of alkali metal hydroxides with relatively weak water-soluble acids, the former constituent being present in an amount not more than about two per cent of the water, by weight and maintaining the contents of said boiler at a temperature of about the boiling point.

2. The method according to claim 1 wherein the composition includes a water-soluble polyhydroxy compound in a molal quantity not greater than that of the polyalkali metal salt of the alkylene polyamine polyacetic acid.

3. Method for treating a boiler to remove scale which comprises substantially filling the boiler with an aqueous solution containing as its essential constituents a polyalkali metal salt of an alkylene polyamine polyacetic acid of the general formula

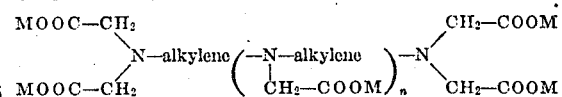

wherein M is an alkali metal, n is zero or a positive integer and the alkylene groups contain not more than four carbon atoms each, and 5 to 50 per cent as much by weight of a water-soluble alkaline-reacting compound having a pH of at least about 8.5 and selected from the group consisting of alkali metal hydroxides and salts of alkali metal hydroxides with relatively weak water-soluble acids, the former constituent being present in an amount not more than about two per cent of the water, by weight, and heating said boiler to raise the contents thereof to about boiling temperature to cause circulation of the composition by means of convection currents, but insufficiently to cause burning of deposited sludge.

4. Method for treating a boiler to remove and prevent scale which comprises introducing into said boiler a composition containing as its essential ingredients a polyalkali metal salt of an alkylene polyamine polyacetic acid of the general formula

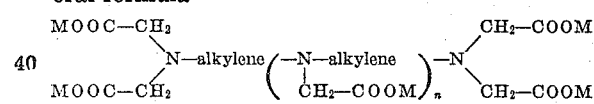

wherein M is an alkali metal, n is zero or a positive integer and the alkylene groups contain not more than four carbon atoms each, free sodium hydroxide, and polyhydroxy compounds, said composition being the crude reaction product obtained by reacting an alkylene polyamine of the formula

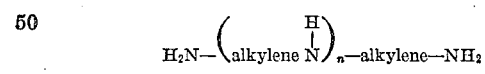

in which n is zero or a positive integer, and in which none of the alkylene groups contains more than four carbon atoms, with an alkali-metal cyanide and formaldehyde with sufficient sodium hydroxide to bring the pH to at least about 9, the reaction being carried out at a temperature of about 60–80° C. under sufficiently reduced pressure to cause the mixture to boil at that temperature, the free cyanide present in the reaction mixture at any one time being not more than ¼ the amount necessary to react completely with the amine, and the amount of free formaldehyde present in the reaction mixture at any one time being about 5 per cent less than the cyanide present except when the reaction is substantially completed, said salt of said alkylene polyamine polyacetic acid being present in an amount between about 0.1 and about 2 per cent by weight of the water present, and maintaining the water solution of said composition in the boiler at about the temperature of boiling.

5. The method for treating a boiler to remove and prevent scale which comprises introducing into said boiler an aqueous composition containing as its essential constituents a polyalkali metal salt of an alkylene polyamine polyacetic acid of the general formula

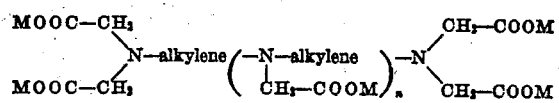

wherein M is an alkali metal, $n$ is zero or a positive integer and the alkylene groups contain not more than 4 carbon atoms each, and 5 to 50 per cent as much by weight of a water-soluble alkaline-reacting compound having a pH of at least about 8.5 and selected from the group consisting of alkali metal hydroxides and salts of alkali metal hydroxides with relatively weak water-soluble acids, the former constituent being present in an amount between about 0.1 and about 2 per cent of the water, by weight and maintaining the contents of said boiler at a temperature of about the boiling point.

6. The method in accordance with claim 5 in which the polyalkali metal salt of an alkylene polyamine polyacetic acid is the tetra sodium salt of ethylene diamine tetraacetic acid, and said alkaline-reacting compound is sodium hydroxide.

7. The method in accordance with claim 5 in which the polyalkali metal salt of an alkylene polyamine polyacetic acid is the penta sodium salt of diethylene triamine pentaacetic acid.

8. The method in accordance with claim 5 in which said alkaline-reacting compound is sodium carbonate.

9. The method in accordance with claim 5 in which the polyalkali metal salt of an alkylene polyamine polyacetic acid is the tetra sodium salt of ethylene diamine tetraacetic acid.

10. The method in accordance with claim 5 in which the amount of said water-soluble alkaline-reacting compound is between 10 and 25 per cent by weight of said alkylene polyamine polyacetic acid salt.

11. The method in accordance with claim 5 in which a polyhydroxy compound is present in an amount not more than about mol for mol with said alkylene polyamine polyacetic acid salt.

FREDERICK C. BERSWORTH.